US006661742B2

United States Patent
Hansen

(10) Patent No.: US 6,661,742 B2
(45) Date of Patent: Dec. 9, 2003

(54) TROLLING MOTOR WITH SONAR TRANSDUCER

(75) Inventor: Ronald P. Hansen, Mapleton, MN (US)

(73) Assignee: Johnson Outdoors Inc., Sturtevant, WI (US)

(*) Notice: Subject to any disclaimer, the term of this patent is extended or adjusted under 35 U.S.C. 154(b) by 0 days.

(21) Appl. No.: 09/977,141

(22) Filed: Oct. 12, 2001

(65) Prior Publication Data
US 2002/0044500 A1 Apr. 18, 2002

Related U.S. Application Data
(60) Provisional application No. 60/240,306, filed on Oct. 13, 2000.

(51) Int. Cl.[7] .............................. H04R 1/00; B01L 11/02
(52) U.S. Cl. ....................................................... 367/173
(58) Field of Search ................................ 367/173; 440/6

(56) References Cited

U.S. PATENT DOCUMENTS

| | | |
|---|---|---|
| 2,429,774 A | 10/1947 | Schultz et al. |
| 2,757,475 A | 8/1956 | Pankove |
| 2,832,944 A | 4/1958 | Kessler |
| 3,059,217 A | 10/1962 | Boswell |
| 3,560,914 A | 2/1971 | Webb |
| 3,740,706 A | 6/1973 | Joseph |
| 3,802,377 A | 4/1974 | Porter et al. |
| 3,880,106 A | 4/1975 | Farmer |
| 4,066,032 A | 1/1978 | Travis |
| 4,110,727 A | 8/1978 | Kriege |
| 4,152,690 A | 5/1979 | Veatch |
| 4,698,032 A | 10/1987 | Hill |
| 4,737,940 A | 4/1988 | Arrington |
| 4,820,208 A | 4/1989 | Phillips, Sr. |
| 4,926,399 A | 5/1990 | Hickman |
| 4,963,779 A | 10/1990 | Lentino et al. |
| 4,995,010 A | 2/1991 | Knight |
| 5,169,349 A | 12/1992 | Hilbert |
| 5,580,287 A | 12/1996 | Wieringa |
| 5,892,338 A | 4/1999 | Moore et al. |
| 5,942,822 A | 8/1999 | Iwata et al. |
| 6,160,764 A | 12/2000 | Powell |
| 2002/0013106 A1 * | 1/2002 | Healey ........................ 440/6 |

OTHER PUBLICATIONS

U.S. patent applicaton Ser. No. 60/218,850, Healey, filed Jul. 2000.*
Johnny Morris "Bass Pro Shops 25th Anniversary" 1997 Catalog, front cover, back cover, pp. 319–328.
JWA Marine, Minn Kota Electric Fishing Motors, 1997, 52 pages.
Motor Guide, Take on the World, Sporting Good, 2000 Catalog, 24 pages.

* cited by examiner

Primary Examiner—Daniel T. Pihulic
(74) Attorney, Agent, or Firm—Foley & Lardner

(57) ABSTRACT

A trolling motor system includes a lower propulsion unit and a transducer assembly. The lower propulsion unit has an external cavity extending into the lower propulsion unit. The transducer assembly includes a sonar transducer and a mount coupled to the sonar transducer. The mount releasably secures the sonar transducer within the cavity. In one exemplary embodiment, the mount includes at least one fastener releasably coupling the mount to the lower propulsion unit. In one exemplary embodiment, the mount releasably secures the sonar transducer within the lower propulsion unit proximate a rear end of the lower propulsion unit.

24 Claims, 10 Drawing Sheets

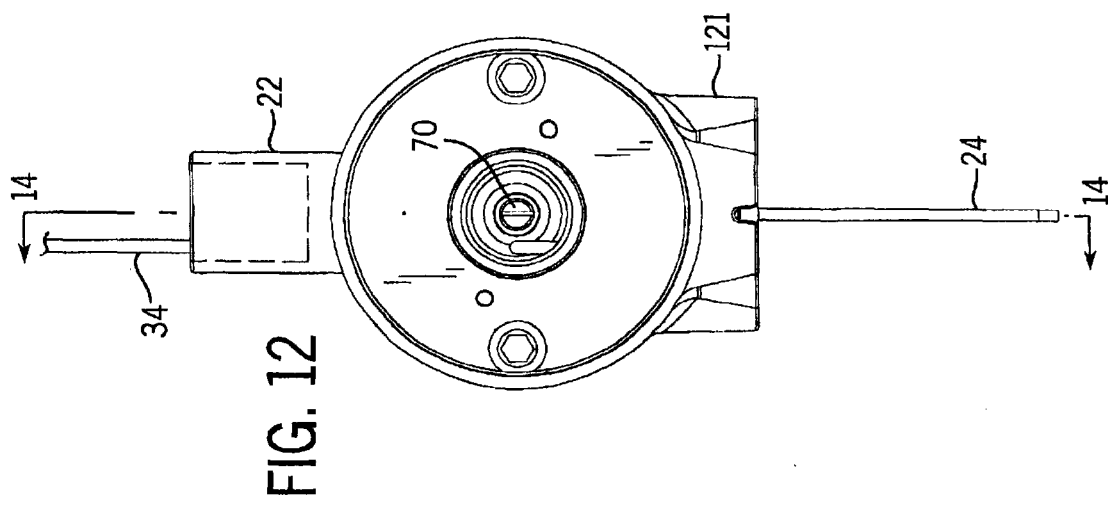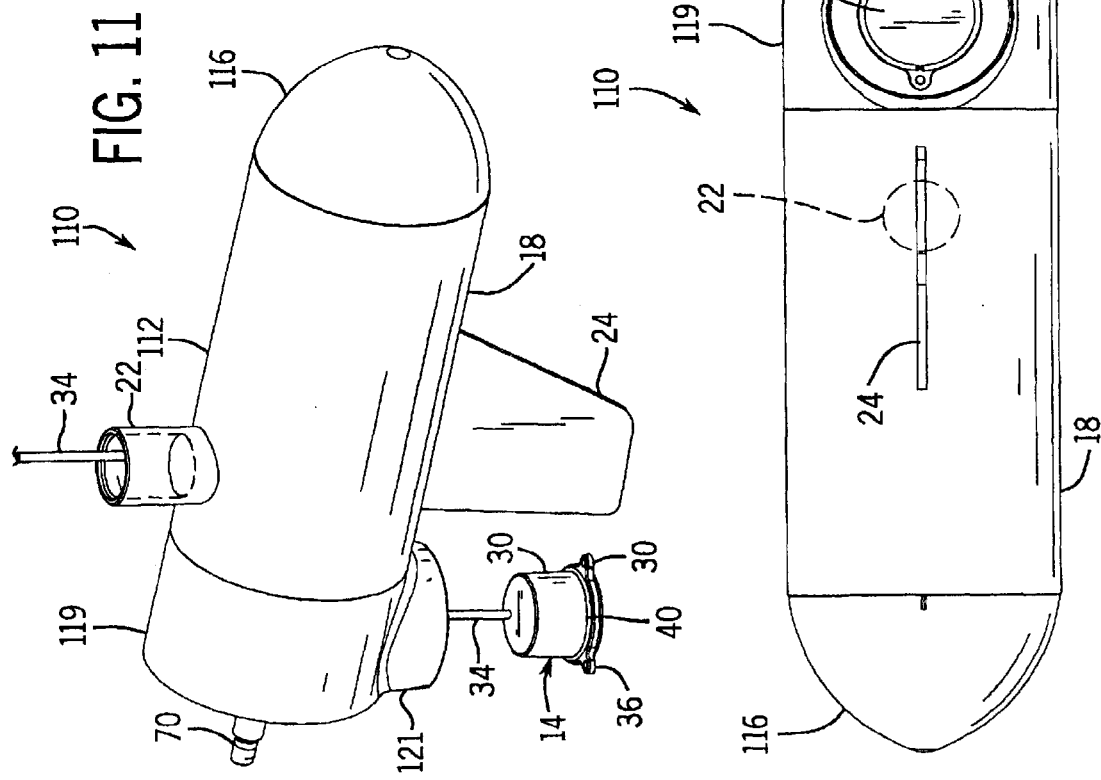

TROLLING MOTOR WITH SONAR TRANSDUCER

CROSS REFERENCE TO RELATED APPLICATIONS

The present application claims priority under 35 U.S.C. §119(e) from U.S. Provisional Application Serial No. 60/240,306 entitled "Trolling Motor With Sonar Transducer" and filed on Oct. 13, 2000 by Ronald P. Hansen, the full disclosure of which is hereby incorporated by reference.

FIELD OF THE INVENTION

The present invention relates to trolling motors and depth finders. In particular, the present invention relates to a trolling motor lower propulsion unit carrying a sonar transducer.

BACKGROUND OF THE INVENTION

Fishing boats and vessels are often equipped with a trolling motor for providing a relatively small amount of thrust to slowly and quietly propel the boat or vessel while an operator is fishing. Such trolling motors typically include an elongate hollow tube which is mounted to a lower propulsion unit at one end including a motor and a propeller and secured to an upper trolling motor head unit or junction box at an opposite end.

During fishing, underwater sonar systems or depth finders are frequently employed to provide an indication of the depth of the water below the lower propulsion unit and to locate fish. Such underwater sonar systems typically include a puck or transducer which is fastened to an exterior of the lower propulsion unit by a band or bracket. The transducer is electrically connected to a control and display unit in the boat by means of an elongate wire extending from the transducer to the control unit. Although commonly employed, such underwater sonar systems or depth finders are extremely susceptible to damage or misalignment during collisions of the lower propulsion unit with underwater vegetation, submerged trees, submerged rocks or the bottom of the body of water. The wire is also susceptible to damage as a result of such collisions.

In recognition of these problems associated with the use of trolling motors and underwater sonar systems, some trolling motor systems alternatively have the sonar transducer embedded within the front nose or bearing cap of the lower propulsion unit with the wire routed through the lower propulsion unit and through the tube to the control and display unit. Although substantially reducing the risk of damage to the sonar transducer and the wire connecting the sonar transducer to the control and display unit, such trolling motor systems are difficult to assemble and repair because the sonar transducer is embedded in the front nose cone or front bearing cap of the lower propulsion unit. Moreover, such trolling motor systems do not generally allow replacement of the sonar transducer without also requiring replacement of the entire front nose cone of the lower propulsion unit. As a result, such trolling motor systems do not generally allow the user to replace an existing sonar transducer and its depth finder controls when the user desires to upgrade his or her system.

Thus, there is a continuing need for a trolling motor system that incorporates a trolling motor transducer and its wiring into the lower propulsion unit, that is easily assembled and repaired and that allows a user to replace the existing depth finder system.

SUMMARY OF THE INVENTION

According to one exemplary embodiment, a trolling motor system including a lower propulsion unit and a sonar transducer. The lower propulsion unit has a front end, a rear end, and a propeller at the rear end. A sonar transducer is received at least partially within the lower propulsion unit proximate the rear end.

According to yet another exemplary embodiment, the trolling motor system includes a lower propulsion unit and a transducer assembly. The lower propulsion unit has an external cavity extending into the lower propulsion unit. The transducer assembly includes a sonar transducer and a mount coupled to the sonar transducer. The mount is fastened to the lower propulsion and releasably secures the sonar transducer within the cavity.

According to yet another exemplary embodiment, a transducer assembly for a trolling motor system having a lower propulsion unit including an external cavity extending into the lower propulsion unit is provided. The transducer assembly includes a sonar transducer and a mount coupled to the sonar transducer. The mount includes at least one fastener configured to releasably fasten the mount to the lower propulsion unit with the sonar transducer positioned within the cavity.

BRIEF DESCRIPTION OF THE DRAWINGS

FIG. 11 is a perspective view of a first alternative embodiment of the trolling motor system of FIG. 1 illustrating a lower propulsion unit and a partially separated transducer unit.

FIG. 12 is a rear elevational view of the trolling motor system of FIG. 11.

FIG. 13 is a bottom plan view of the trolling motor system of FIG. 11.

DETAILED DESCRIPTION OF THE PREFERRED EMBODIMENTS

Figure 1:
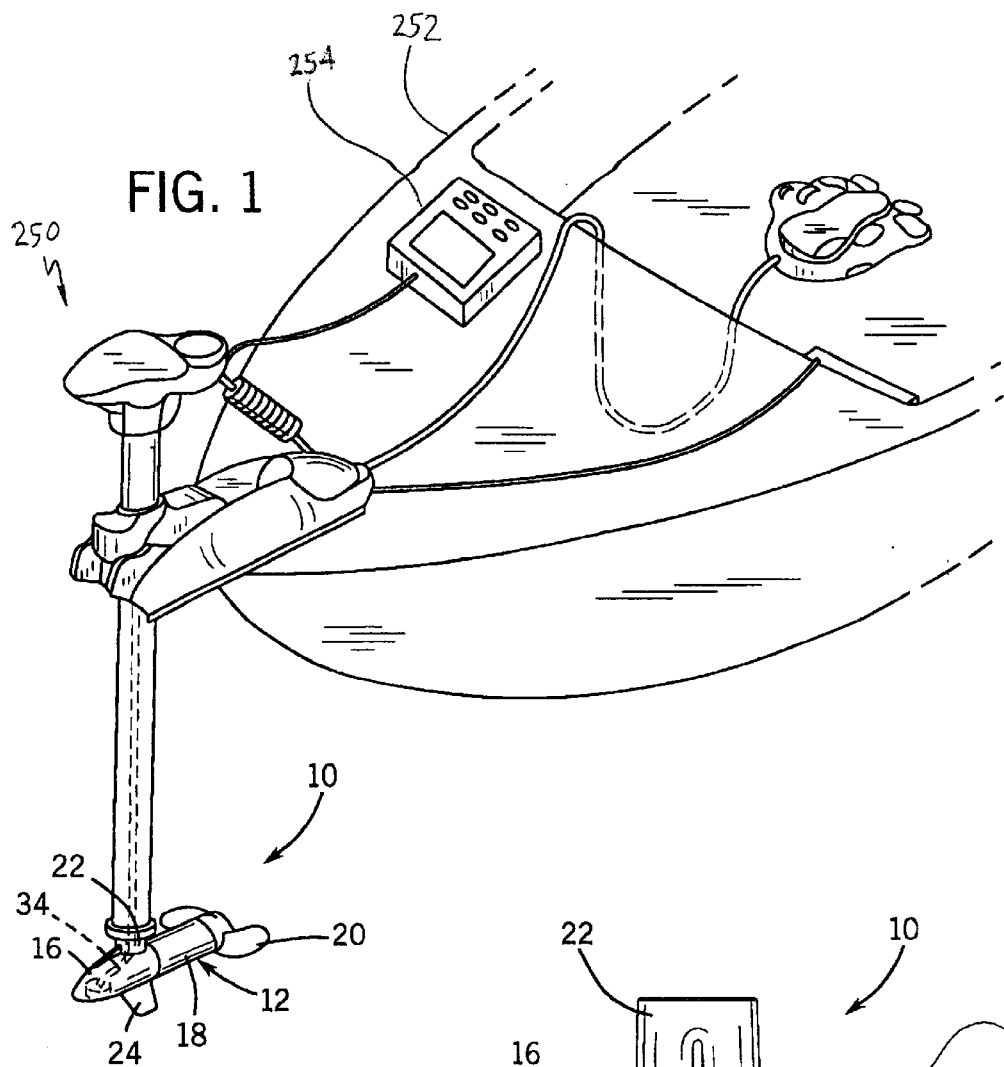
FIG. 1 is a perspective view of a trolling motor system of the present invention provided as part of an overall trolling motor system employed with a watercraft.
Figure 2:
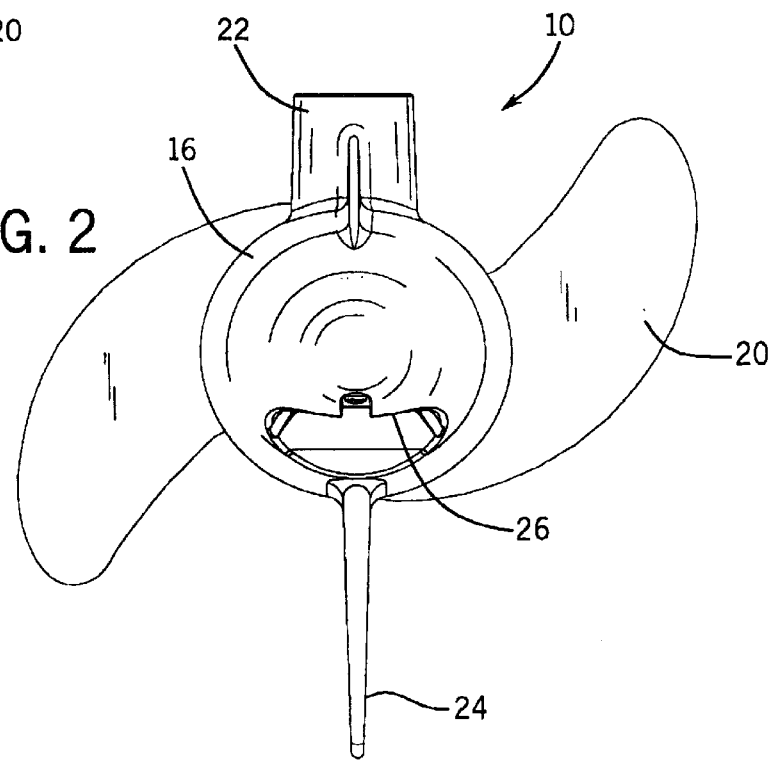
FIG. 2 is a rear elevational view of the trolling motor system of FIG. 1 separated from the watercraft.
Figure 3:
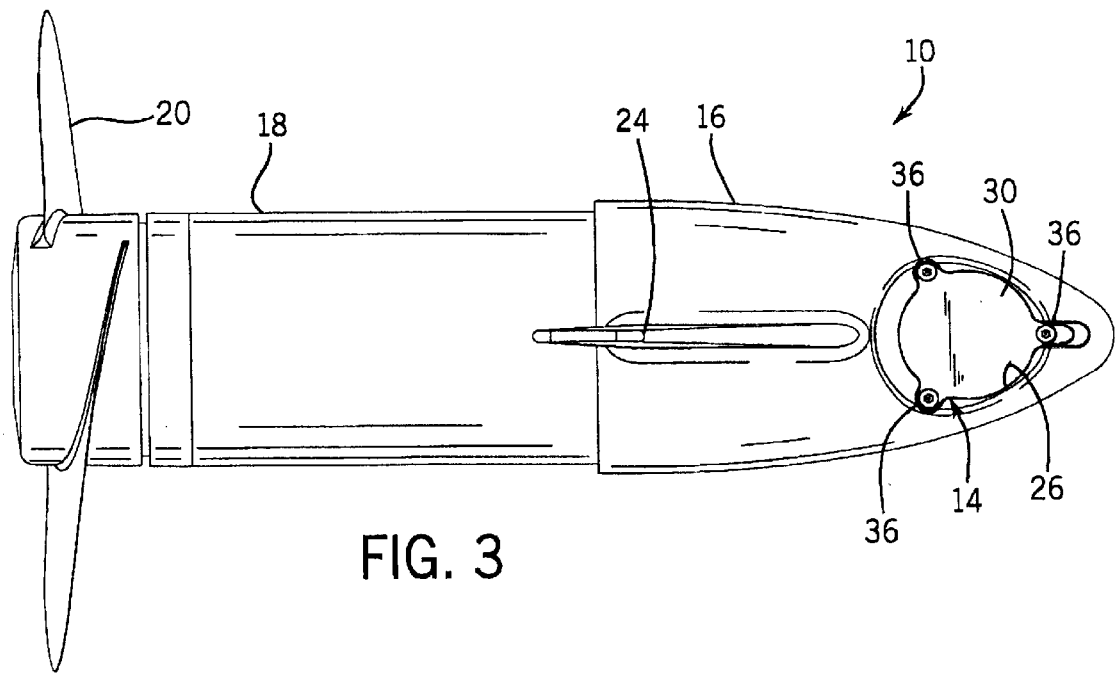
FIG. 3 is a top elevational view of the trolling motor system of FIG. 1.
Figure 4:
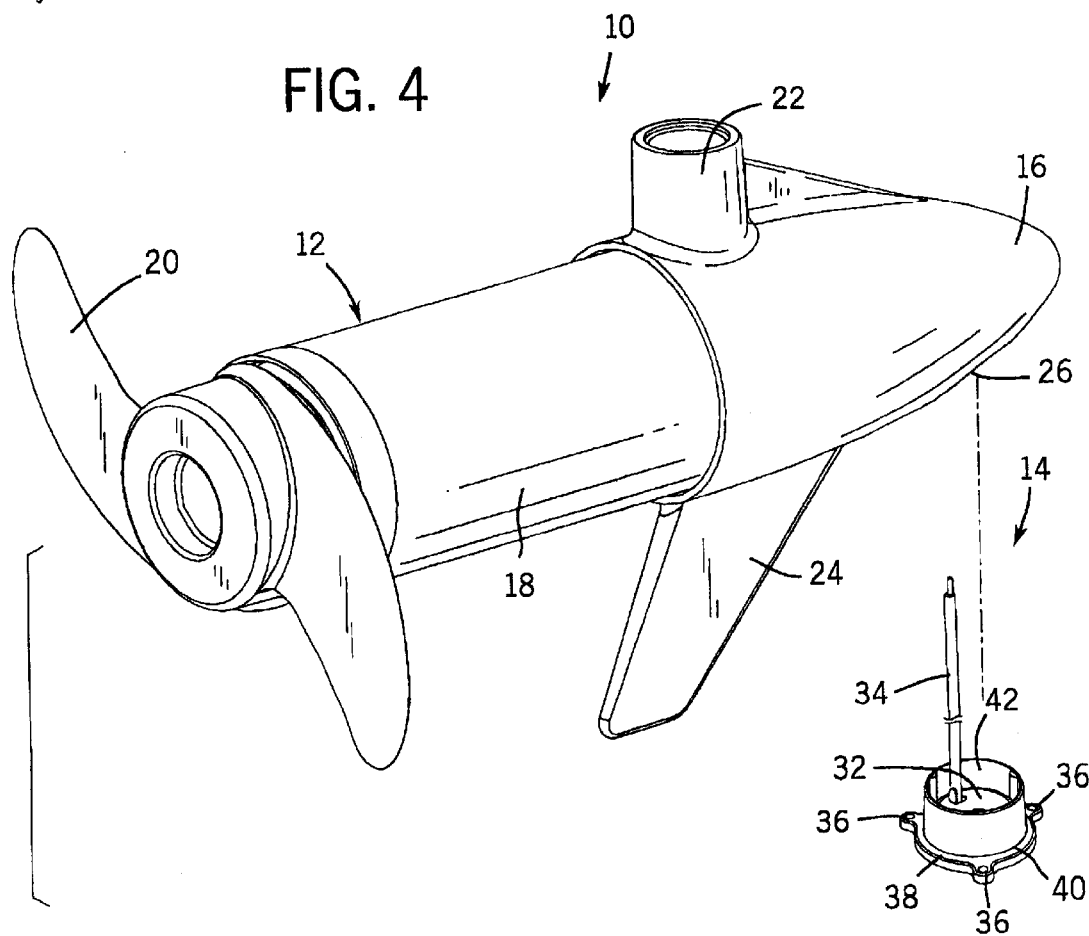
FIG. 4 is a perspective view of the trolling motor system of FIG. 1 illustrating a lower propulsion unit separated from a transducer assembly.

FIGS. 1–4 illustrate trolling motor system 10. FIG. 1 illustrates trolling motor system 10 provided as part of an overall trolling motor system 250 employed on a boat 252 with an underwater sonar system 254. Trolling motor system 250, boat 252 and underwater sonar system 254 are similar to such systems described in U.S. Pat. No. 6,254,441 and co-pending U.S. patent application Ser. No. 09/592,023 entitled TROLLING MOTOR SYSTEM and filed on Jun. 12, 2000 (the full disclosures of which are hereby incorporated by reference) except that system 250 alternatively includes trolling motor system 10 in lieu of the illustrated propulsion unit and transducer. FIG. 2 is a rear elevational view of trolling motor system 10 separated from system 250. FIG. 3 is a top elevational view of trolling motor system 10. FIG. 4 is a perspective view of trolling motor system 10 illustrating transducer assembly 14 separated from lower propulsion unit 12. Lower propulsion unit 12 is generally configured for being mounted to a boat or other vessel by conventionally known motor tube and mounting mechanism (not shown). As shown by FIGS. 1–4, lower propulsion unit 12 generally includes a front nose cone or bearing cap 16, main housing 18, propeller 20, tube mounting portion 22, and fin 24. Front bearing cap 16 houses bearings for a shaft or propeller described in greater detail hereafter. Front bearing cap 16 further includes a recessed opening 26 along its underside into which transducer assembly 14 is removably positioned. In the exemplary embodiment, front bearing cap 16 additionally supports motor tube mounting portion 22 and fin 24. Motor tube mounting portion 22 extends from an upper side of bearing cap 16 and is configured to mount to a motor tube (not shown). Fin 24 extends from an opposite lower side of lower propulsion unit 12.

Main housing 18 is mounted to front bearing cap 16 and includes the main motor components of lower propulsion unit 12. Main housing 18 further supports propeller 20 which, upon being driven, generates thrust.

FIGS. 3 and 4 best illustrate transducer assembly 14. As shown by FIG. 4, transducer assembly 14 generally includes mount 30, sonar transducer 32 and wire 34. Mount 30 is configured to removably mount transducer 32 in recess 26 of lower propulsion unit 12. In the exemplary embodiment, mount 30 comprises a generally cup-shaped member having a plurality of ears 36 having bores therethrough. Ears 36 facilitate the securement of mount 30 to lower propulsion unit 10 within cavity 26 by means of fasteners such as screws. Because mount 30 is preferably secured to lower propulsion unit 10 by fasteners such as screws, mount 30 is reliably coupled to lower propulsion unit 10 without the need for relying upon air pressure seals and the like to maintain mount 30 and transducer 32 in recess 26. Mount 30 additionally includes a shoulder 38 upon which an O-ring 40 is supported. Shoulder 38 extends opposite to a corresponding surface about cavity 26 when mount 30 is positioned within cavity 26 such that O-ring 40 provides a seal therebetween to prevent the ingress of water into cavity 26 and into the interior of lower propulsion unit 12. Although mount 30 is illustrated for use with an O-ring, mount 30 may alternatively be configured for use with a variety of alternative sealing structures and/or materials. Although mount 30 is illustrated as a cup-shaped member, mount 30 may have a variety of alternative shapes and configurations depending upon the size and shape of cavity 26, the size and shape of transducer 32 and the particular location of transducer assembly 14 in lower propulsion unit 12.

Figure 5:
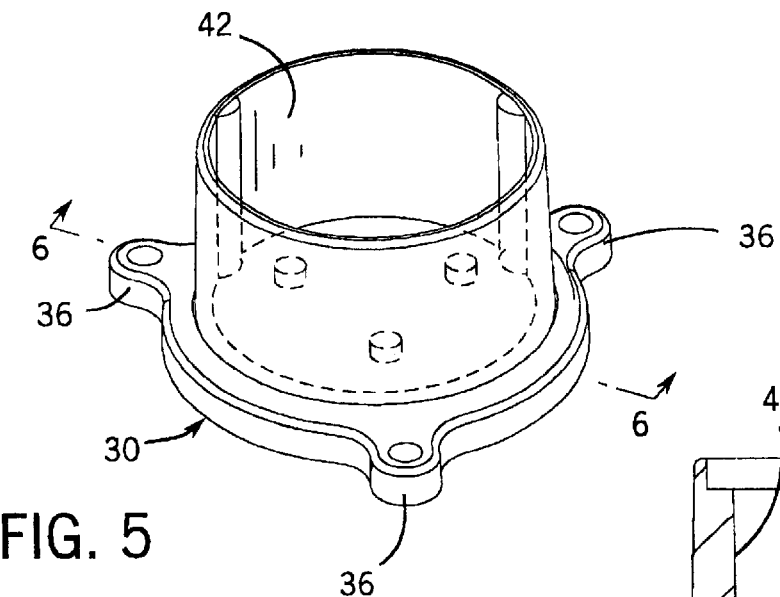
FIG. 5 is a perspective view illustrating a mount of the transducer assembly of FIG. 4.
Figure 6:
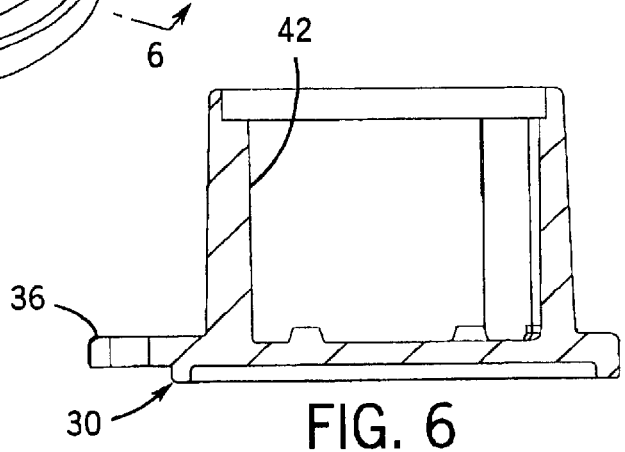
FIG. 6 is a sectional view of the mount of FIG. 5 taken along line 6—6.

Sonar transducer 32 comprises a conventionally known sonar transducer specifically sized and configured to fit within interior 42 of mount 30. Alternatively, sonar transducer 32 may have alternative configurations and sizes depending upon the exact configuration of mount 30. Sonar transducer 32 is operably coupled to wire 34 which transmits signals for presenting a depth of water below sonar transducer 32 and/or the possible location of fish below sonar transducer 32 within its effective beam or range. Mount 30 is illustrated in greater detail in FIGS. 5 and 6. As will be appreciated, the exact dimensions and shapes may be varied.

Figure 7:
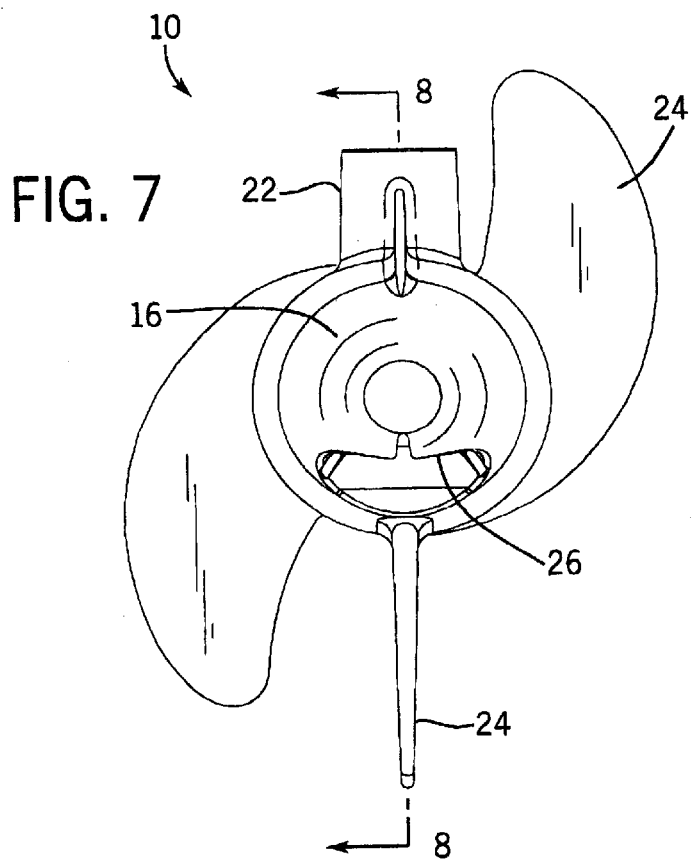
FIG. 7 is a front elevational view of the trolling motor system of FIG. 1.
Figure 8:
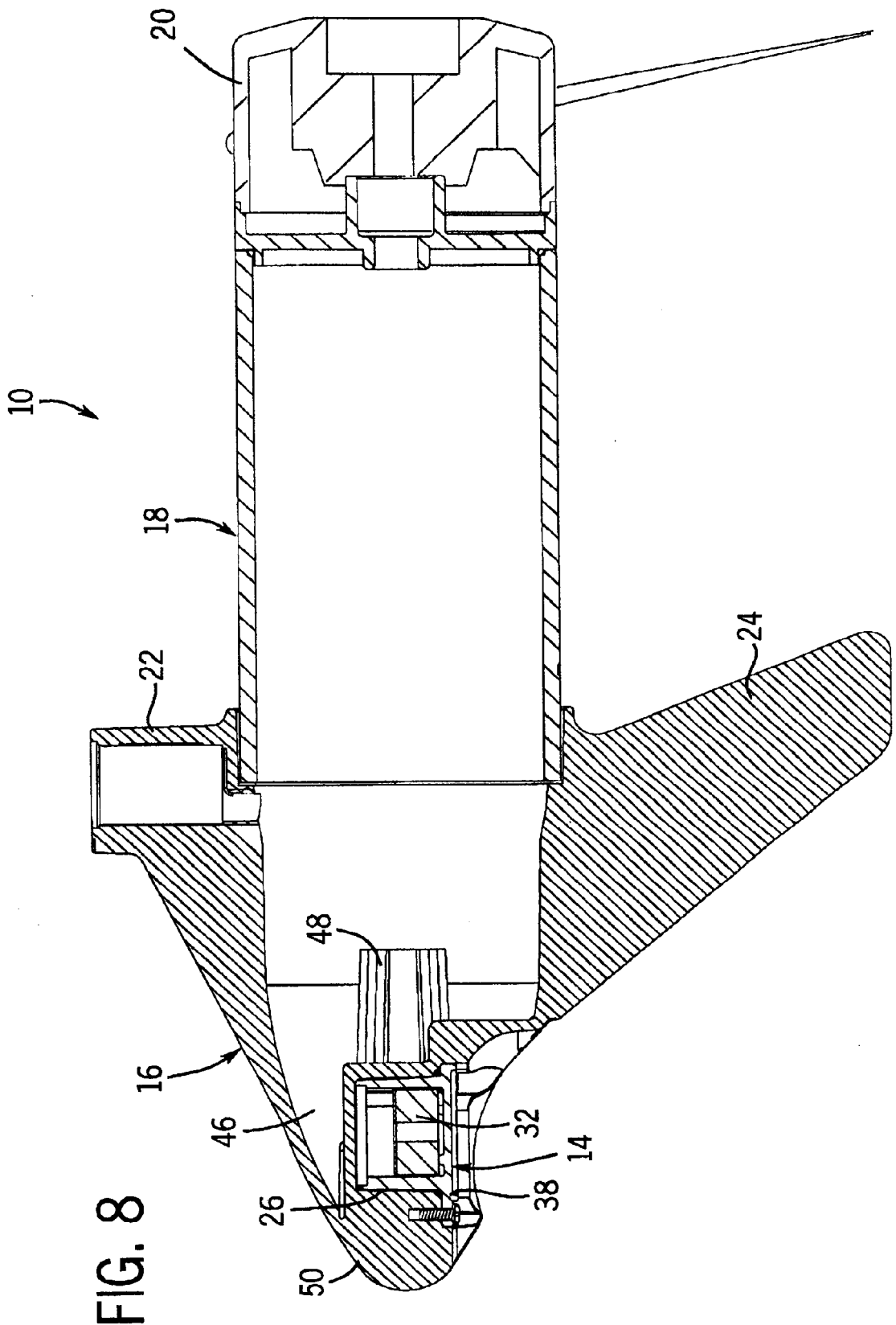
FIG. 8 is a sectional view of the trolling motor system of FIG. 1 taken along line 8—8 of FIG. 7 and omitting a motor and other internal components of the lower propulsion unit.

FIGS. 7 and 8 illustrate trolling motor assembly 10 in greater detail. In particular, FIG. 7 is a front elevational view of trolling motor system 10. FIG. 8 is a sectional view of trolling motor system 10 taken along lines 8—8 of FIG. 7 and omitting the motor and other internal components of lower propulsion unit 12. As best shown by FIG. 8, bearing cap 16 includes a hollow interior 46 in which a bearing support 48 extends. Bearing support 48 carries one or more bearings (not shown) for rotatably supporting the shaft of a motor (not shown). Bearing cap 16 additionally includes a forward extending nose portion 50 in front of shaft support 48. Nose portion 50 forms cavity 26 into which transducer assembly 14 is positioned. As shown by FIG. 8, insertion of transducer assembly 12 into cavity 26 causes shoulder 38 to compress O-ring 40 against a lower surface of nose portion 50 as to form a seal therebetween. Because transducer assembly 12 is completely recessed within cavity 26, transducer assembly 12 is protected from accidental collisions with underwater objects or structures. At the same time, transducer assembly 12 may be easily withdrawn from cavity 26 and nose portion 50 for repair or replacement.

Figure 9:
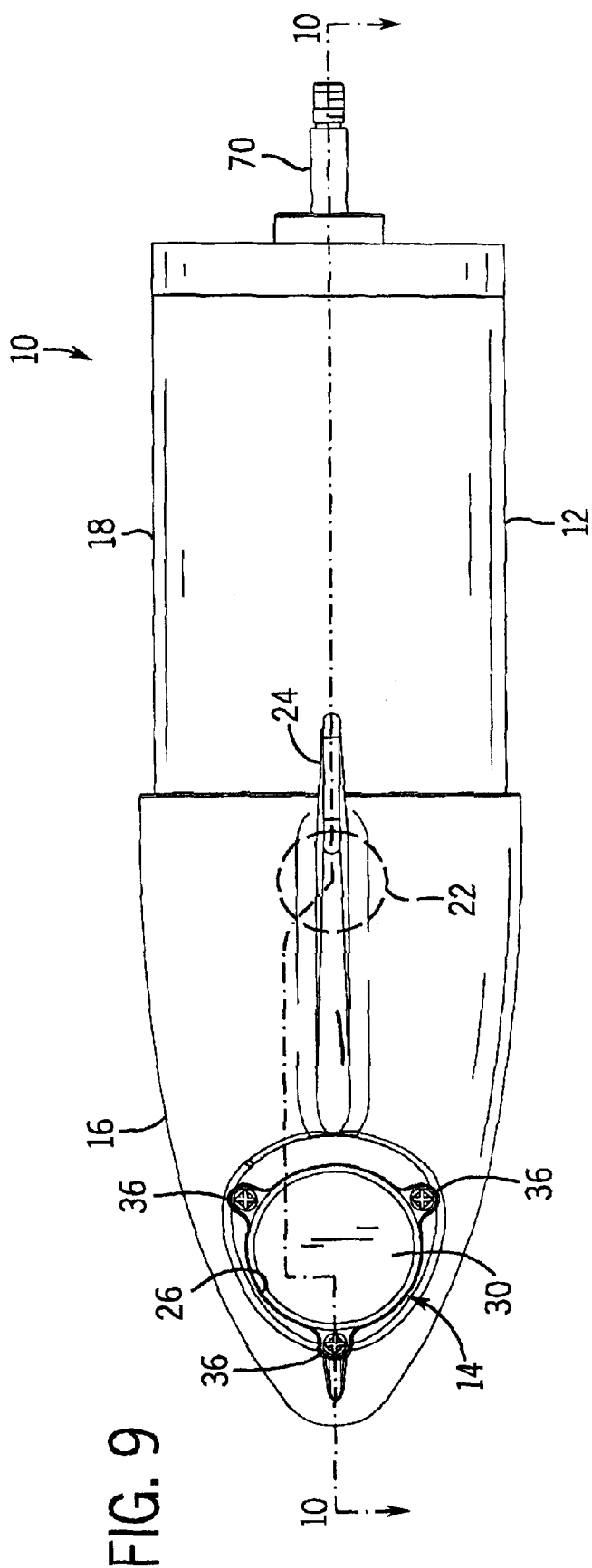
FIG. 9 is a bottom plan view of the trolling motor system of FIG. 1 with a propeller removed for purposes of illustration.
Figure 10:
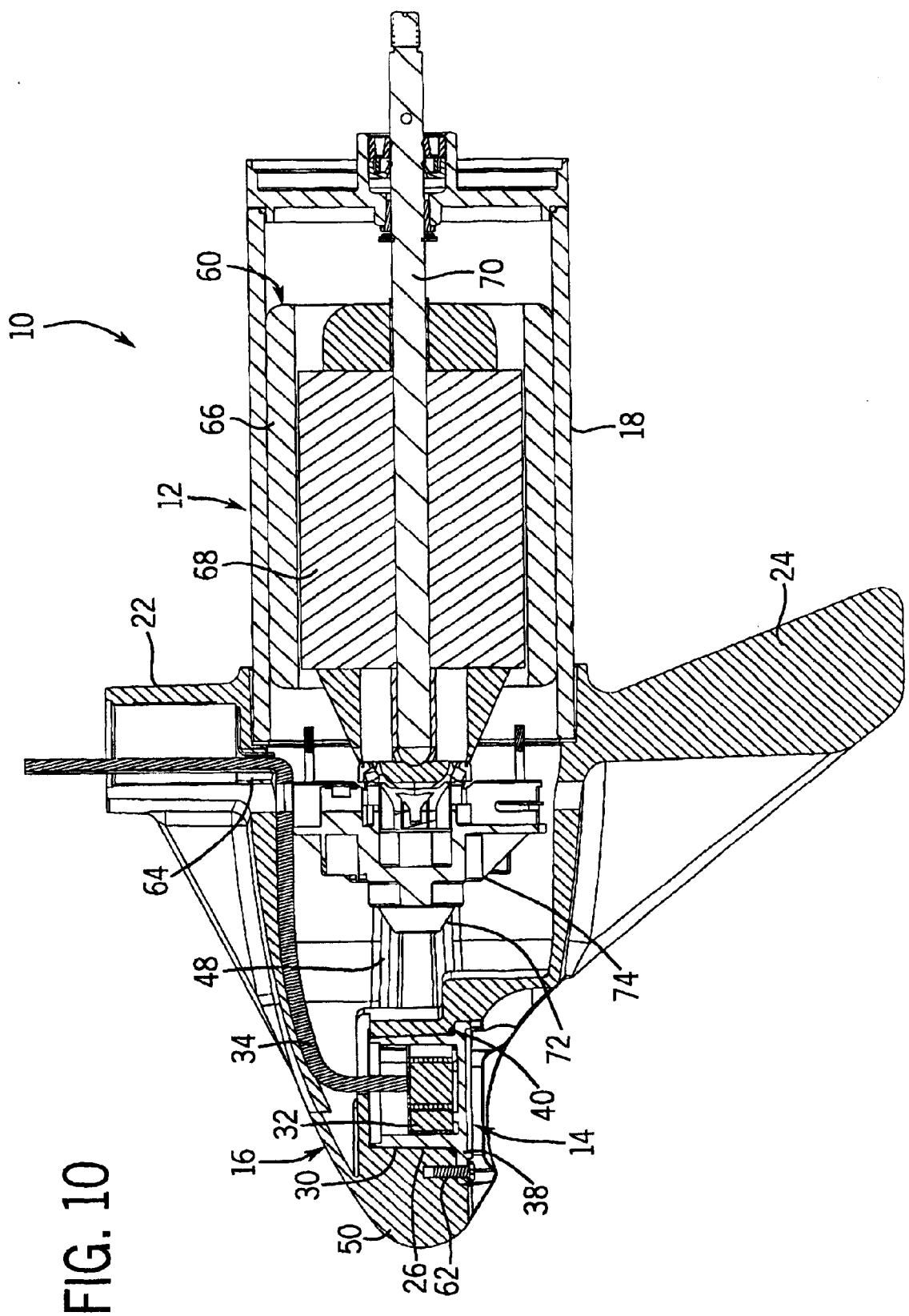
FIG. 10 is a sectional view of the trolling motor system of FIG. 9 taken along line 10—10.

FIGS. 9 and 10 illustrate trolling motor system 10 in even greater detail. FIG. 9 is a bottom plan view of trolling motor system 10 with the blade of propeller 20 removed for purposes of illustration. FIG. 10 is a sectional view of trolling motor system 10 taken along line 10—10 of FIG. 9. FIG. 10 illustrates motor 60 of lower propulsion unit 12 and further illustrates the routing of wire 34 within lower propulsion unit 12. Motor 60 is conventionally known and generally includes permanent magnet 66 (stator) mounted to center section 18, armature 68, shaft 70, bearings 72, and brush plate assembly 74 including conventionally known motor brushes and a commutator.

As shown by FIG. 10, fasteners 62 (preferably screws) secure transducer assembly 12 within cavity 26 in nose portion 50. Cable or wire 34 is connected to sonar transducer 32 at one end and extends along the internal wall of bearing cap 16 to port 64 which communicates with motor tube mounting portion 22. Wire 34 extends through port 64 into the interior of tube mounting portion 22. Although not shown in greater detail, wire 34 extends upward through the motor tube to a control and display unit (not shown). Although not specifically illustrated, integrally formed guides may be provided along the interior surface of cap 16 to retain and maintain the positioning of wire 34. In alternative embodiments, such electrical coupling mechanisms such as cables or wires and the like may be omitted where the sonar transducer is configured or is coupled to a device configured to transmit data signals to a control and display unit by other conventionally known or future developed means such as radio frequency waves and the like.

In use, to replace or repair sonar transducer 32, the user merely needs to unscrew or otherwise detach fasteners 62 and withdraw mount 30, pulling wire 34 therethrough. A new or repaired transducer 32 may be mounted to lower propulsion unit 12 by positioning a new repair transducer 32 within mount 30, by threading wire 34 through cap 16, through mounting portion 22 and through the motor tube (not shown) to the control and display unit. Thereafter, mount 32 is secured in place by re-securing fastener 62 so as to compress O-ring 40 against cap 16 to reform the seal. In alternative embodiments, trolling motor system 10 may alternatively include quick connect/disconnect means for enabling transducer assembly 14 to be withdrawn from cavity 26 and to be separated from at least a portion of wire 34 so as to eliminate the need for pulling wire 34 out of system 10 or for threading wire 34 through system 10 and the motor tube. Such quick connect/disconnect means may comprise a variety of conventionally known wire or electrical cable coupling mechanisms. Such mechanisms are preferably mounted within cap 16 proximate to cavity 26 such that the user may unfasten fastener 62, withdraw transducer assembly 14 and then disconnect transducer assembly 14 from the portion of wire 34 extending through the motor tube. Wire 34 is preferably provided with a sufficient length between the quick connect/disconnect mechanism and transducer assembly 32 so as to enable transducer assembly 14 to be withdrawn from cavity 26 prior to disconnection. In yet another alternative embodiment, wire 34 may itself terminate at a quick disconnect mechanism, whereby transducer assembly 14 is directly connected or disconnected from the quick connect/disconnect mechanism. For example, wire 34 may alternatively terminate at a female or male portion of a plug, wherein transducer 32 includes a mating opposite male or female portion of a plug.

Overall, trolling motor system 10 provides a sonar transducer 32 that may be quickly and easily removed for repair or replacement. In addition, mount 30 enables sonar transducer 32 to be easily assembled as part of trolling motor system 10, reducing assembly costs and time. At the same time, trolling motor system 10 protects sonar transducer 32 from accidental collisions with underwater obstructions.

Figure 14:
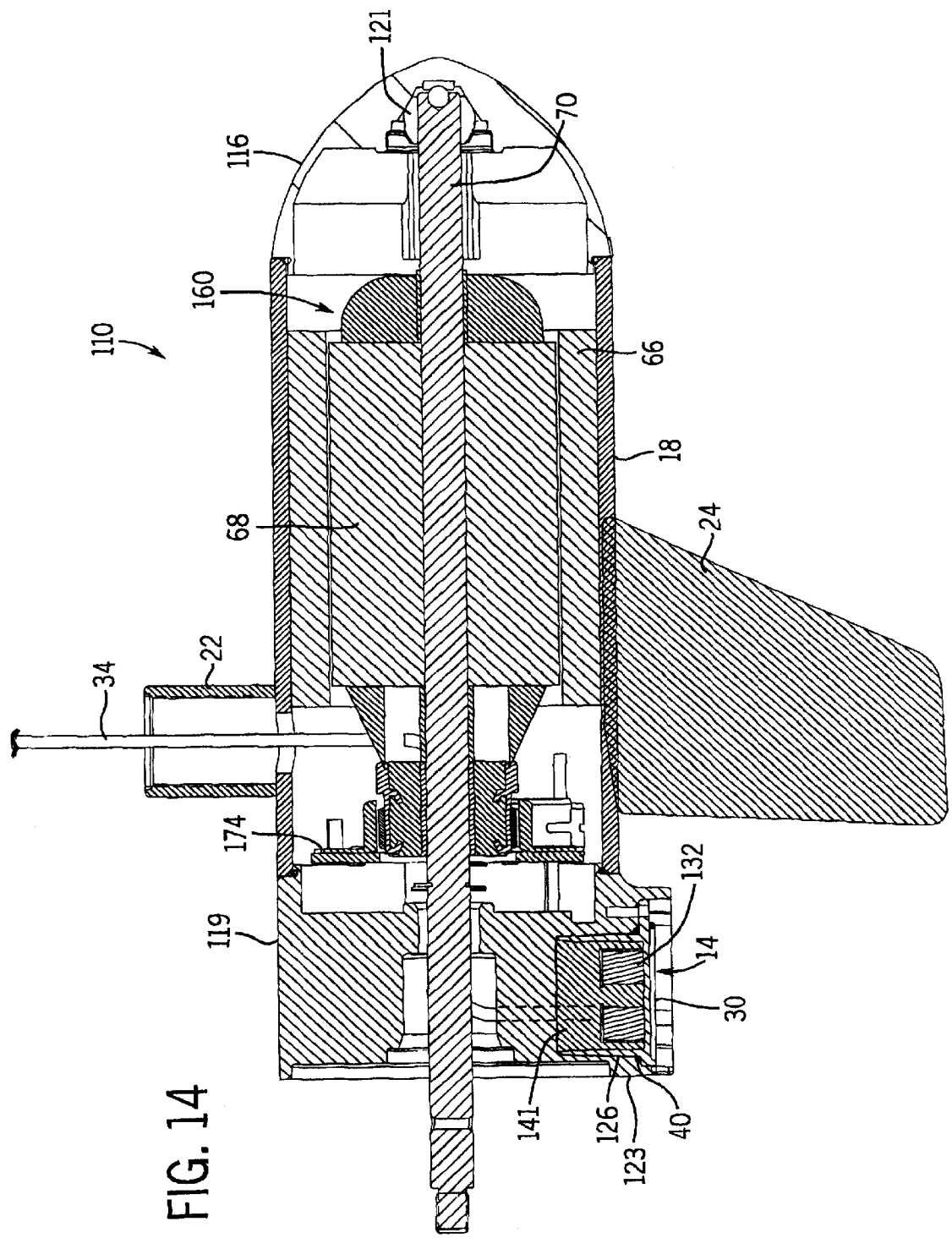
FIG. 14 is a sectional view of the trolling motor system of FIG. 12 taken along line 14—14.
Figure 16:
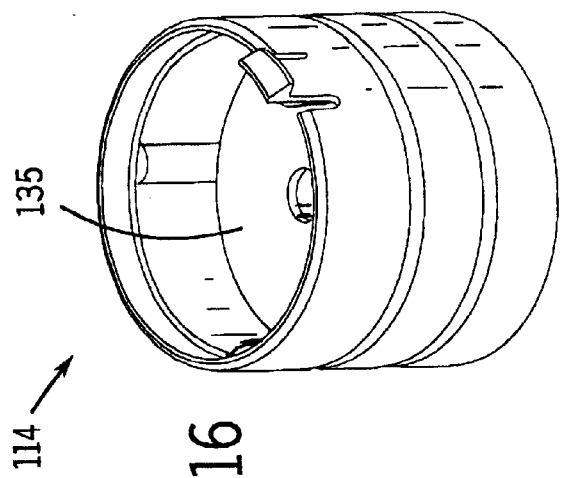
FIG. 16 is a perspective view of an alternative embodiment of the transducer unit of FIG. 11.

FIGS. 11–14 illustrate the trolling motor system 110, an alternative embodiment of trolling motor system 10. Trolling motor system 110 is similar to trolling motor system 10 except that trolling motor system 110 includes a lower propulsion unit 112 in lieu of lower propulsion unit 12. For ease of illustration, those remaining elements of trolling motor system 110 which correspond to similar components of system 10 are numbered similarly. Lower propulsion unit 112 is similar to the lower propulsion unit 12 except that lower propulsion unit 112 includes bearing cap 116 in lieu bearing cap 16, includes motor 160 in lieu of motor 60 and additionally includes brush end housing or rear housing 119. As best shown by FIG. 14, front bearing cap 116 comprises a nose cone having an interior supporting a bearing 121 for rotatably supporting shaft 70 of motor 160. Motor 160 is similar to motor 60 except that motor 160 includes a brush plate assembly 174 at a rear of center section 18, rather than towards bearing cap 116. The remaining components of motor 160 which correspond to motor 60 are numbered similarly.

Figure 17:
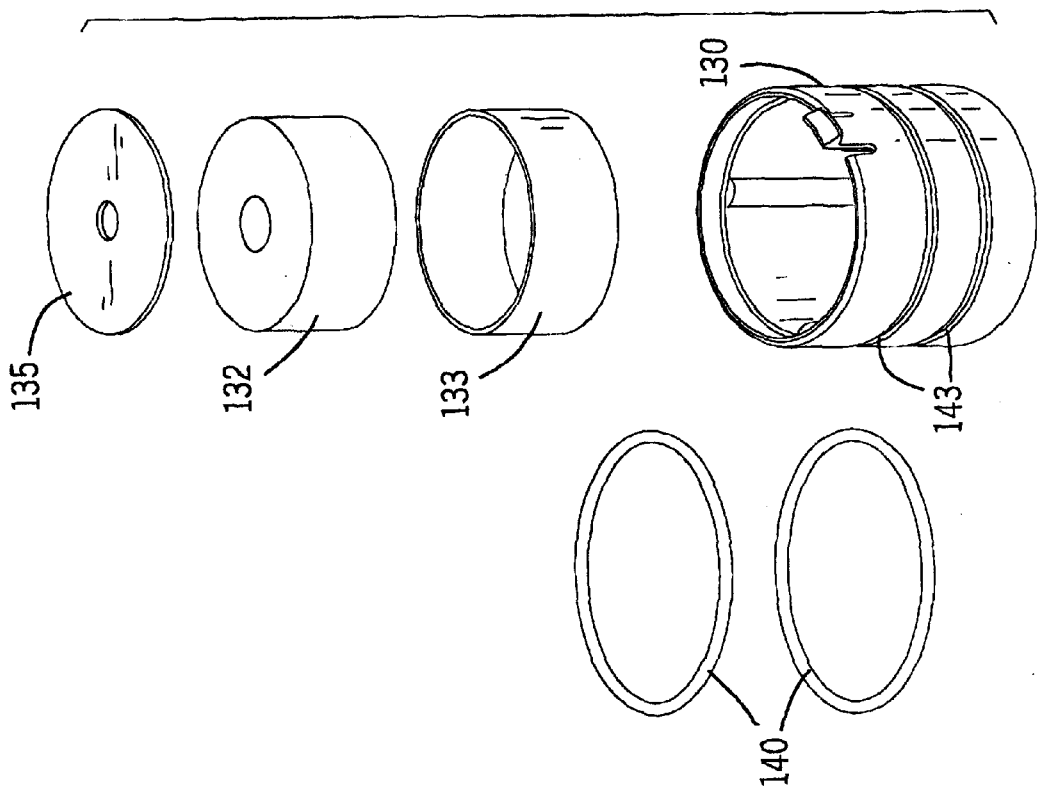
FIG. 17 is an exploded perspective view of the transducer unit of FIG. 16.

Rear housing 119 mounts to a rear of center section 18 and supports transducer assembly 14. In the exemplary embodiment, rear housing 119 includes a downwardly projecting extension portion 123 which provides a downwardly facing cavity 126 into which transducer assembly 14 is removably positioned. Wire 34 extends from sonar transducer 32 through rear housing 119, through center section 18, through mounting portion 22, and through the motor tube (not shown) to a control and display unit (not shown). As shown by FIG. 17, sonar transducer 132 is preferably secured within mount 30 by means of a potting compound 141. Alternatively, sonar transducer 132 may be secured within mount 30 by means of a press fit, by adhesives or by mechanical fasteners or inner locks. Although rear housing 118 is illustrated as including a downwardly projecting extension portion 123, rear housing 119 may alternatively have the same outer diameter as center section 18 about its entire circumference so long as sufficient space is provided for enabling transducer assembly 14 to be positioned within a cavity in rear housing 119.

Similar to trolling motor system 10, trolling motor system 110 protects transducer assembly 14 from accidental collisions with underwater obstructions, provides easy access to transducer assembly 14 for repair, enables trolling motor system 110 to be easily and inexpensively manufactured, and enables a user to replace transducer assembly 14 such as when transducer assembly 14 is irreparably damaged or the user desires to upgrade his or her depth finder system. In addition, because rear housing 119 enables transducer assembly 14 to be supported at a rear end of lower propulsion unit 112, transducer assembly 14 may be positioned closer to brush plate assembly 174. As a result, the routing of wire or cable 34 within lower propulsion unit 112 is shorter and simplified, also facilitating easier and less expensive manufacture of trolling motor system 110.

Figure 15:
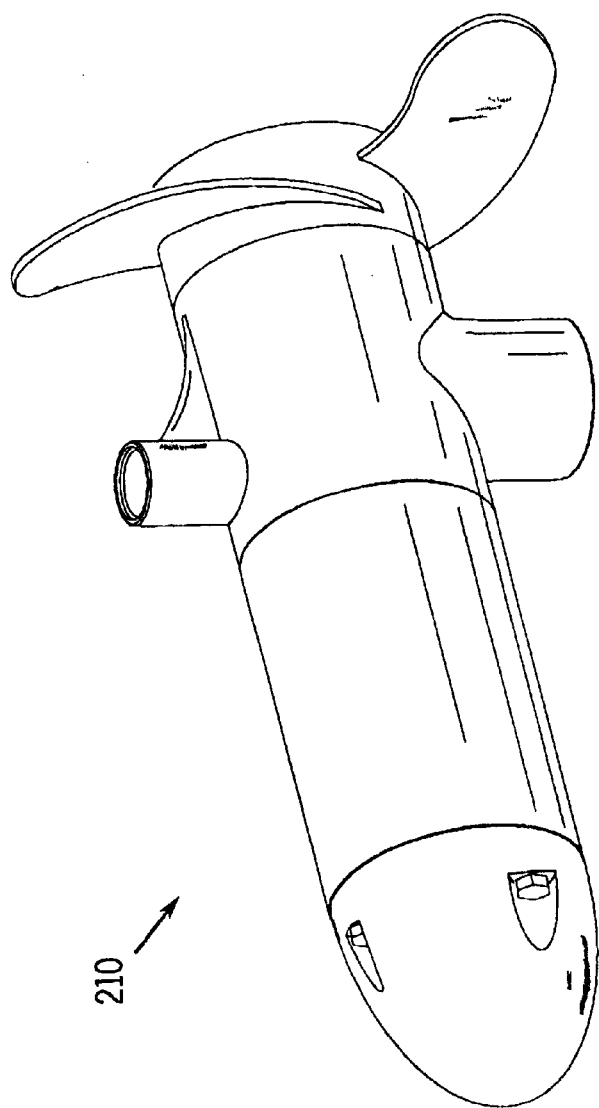
FIG. 15 is a perspective view of a second alternative embodiment of the trolling motor system of FIG. 1.

Although trolling motor system 110 is illustrated as including transducer assembly 14 having mount 30, trolling motor system 110 may alternatively be configured for use with other variously configured transducer assemblies. For example, as discussed above with respect to trolling motor system 10, transducer assembly 14 may alternatively have other configured mounts whereby a seal is formed between the mount and surfaces about the cavity receiving the transducer assembly or whereby a seal integrally formed with center section 18. Center section 18 may also be integrally formed with rear housing 119 and trolling motor system 110. FIG. 15 illustrates trolling motor system 210, an alternative embodiment of trolling motor system 110.

Figure 18:
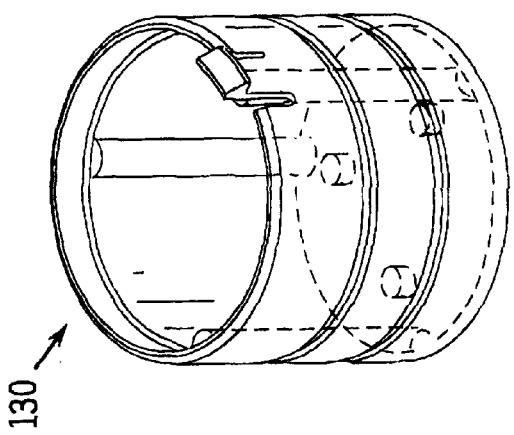
FIG. 18 is a perspective view of a mount of the transducer unit of FIG. 16.

As discussed above, transducer assembly 114 may have a variety of alternative configurations. FIGS. 17 and 18 illustrate an alternative transducer assembly 14. In particular, FIG. 17 is an exploded perspective view of transducer assembly 114 shown in FIG. 18. As best shown by FIG. 18, transducer assembly 114 includes mount 130, sonar transducer 132, cork strip 133, cork disk 135, and O-rings 140. Mount 130 is a generally cup-shaped member including external circumferential grooves 143 which are sized to receive O-rings 140. O-rings 140 fit within grooves 143 and form a seal between mount 130 and circumferential surfaces of the lower propulsion unit housing about the cavity into which transducer assembly 114 is inserted.

Sonar transducer 132 comprises a conventionally known transducer. Cork strip 133 and cork disk 135 secure transducer 132 in mount 130. As will be appreciated, other materials and structures may also be used to secure transducer 132 in mount 130 and to protect the transducer from vibration and the like. Although not shown, transducer assembly 114 preferably includes an additional potting compound placed above disk 135 and mount 130. Cable 34 (shown in FIG. 14) is preferably secured, such as by soldering, to transducer 132 and is routed through the lower propulsion unit and through the motor tube to a control and display device.

Although mount 130 is illustrated as including grooves which receive O-rings for the purpose of providing and forming a seal with the lower propulsion unit in which transducer assembly 114 is employed, mount 130 may alternatively be provided with various other sealing structures or mechanisms, such as gaskets. In addition, in lieu of comprising a cup-shaped member, mount 130 may alternatively simply comprise a lid, plate, cover or disk which captures sonar transducer 32 within cavity 126 and forms a seal over and about cavity 26 between the mount and the lower propulsion unit. Moreover, these gaskets, O-rings or other sealing structures employed may alternatively be supported by the lower propulsion unit itself proximate or adjacent to the cavity or other structure into which the transducer assembly is positioned.

Although the present invention has been described with reference to preferred embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A trolling motor system comprising:
    a lower propulsion unit having a front end and a rear end, wherein the lower propulsion unit includes a propeller at the rear end; and
    a sonar transducer received at least partially within the lower propulsion unit proximate the rear end;
    wherein the sonar transducer is removably received within the lower propulsion unit proximate the rear end;
    wherein the lower propulsion unit has an interior and an exterior, wherein the lower propulsion unit includes a radially extending cavity extending from the exterior to the interior and wherein the cavity removably receives the sonar transducer.

2. The system of claim 1 including a seal between the sonar transducer and the lower propulsion unit to prevent ingress of water from the exterior to the interior of the lower propulsion unit.

3. The system of claim 2, wherein the sonar transducer is coupled to a mount and wherein the mount forms a seal with the lower propulsion unit.

4. The system of claim 3, wherein the mount is cup-shaped and receives the sonar transducer.

5. The system of claim 4, wherein the mount includes a shoulder and an O-ring and wherein the O-ring is compressed by the shoulder against the lower propulsion unit to form a seal between the lower propulsion unit and the mount when the mount is secured to the lower propulsion unit.

6. The system of claim 3, wherein the mount is removably secured to the lower propulsion unit by fasteners.

7. The system of claim 1 including a transducer cable connected at one end to the transducer and extending through an interior of the lower propulsion unit.

8. A trolling motor system comprising:
    a lower propulsion unit having a front end and a rear end, wherein the lower propulsion unit includes a propeller at the rear end; and
    a sonar transducer received at least partially within the lower propulsion unit proximate the rear end;
    wherein the sonar transducer is removably received within the lower propulsion unit proximate the rear end;
    wherein the lower propulsion unit includes a motor having a brush card proximate the rear end.

9. A trolling motor system comprising:
    a lower propulsion unit having an external cavity extending into the lower propulsion unit; and
    a transducer assembly including:
        a sonar transducer; and
        a mount coupled to the sonar transducer, the mount being fastened to the lower propulsion unit and releasably securing the sonar transducer within the cavity.

10. The system of claim 9, wherein the mount forms a seal about the cavity.

11. The system of claim 10 including an O-ring captured between the mount and the lower propulsion unit about the cavity.

12. The system of claim 9, wherein the lower propulsion unit includes a front end and a rear end, wherein the lower propulsion unit includes a propeller proximate the rear end and wherein the cavity is adjacent the rear end.

13. The system of claim 9, wherein the lower propulsion unit includes a front end and a rear end, wherein the lower propulsion unit includes a propeller proximate the rear end and wherein the cavity is adjacent the front end.

14. The system of claim 9, wherein the mount partially receives the transducer.

15. The system of claim 9 including a cable electrically coupled to the sonar transducer at a first end and extending through an interior of the lower propulsion unit.

16. The system of claim 9, wherein the lower propulsion unit includes a motor having a stator, wherein the cavity is rearward the stator.

17. The system of claim 11, including a signal transmitting electrical coupling mechanism having a first end adapted to be coupled to a control and display unit and a second end, wherein the second end of the electrical coupling mechanism and the sonar transducer are releasably interconnected by a quick disconnect mechanism.

18. A transducer assembly for use with a lower propulsion unit having an external cavity extending into the lower propulsion unit, the transducer assembly comprising:
    a sonar transducer;
    a mount coupled to the sonar transducer, the mount adapted to be fastened to the lower propulsion unit and configured to releasably couple the sonar transducer to the lower propulsion unit within the external cavity.

19. The system of claim 17 wherein the quick disconnect mechanism includes a plug assembly having one of a female portion and a male portion coupled to the sonar transducer and the other of the female portion and male portion coupled to the second end of the electrical coupling mechanism.

20. The system of claim 11 wherein the mount is releasably coupled to the lower propulsion unit by at least one fastener.

21. The system of claim 1 wherein the lower propulsion unit further comprises a tube mounting portion located between the front end and the rear end, and wherein the sonar transducer is located between the tube mounting portion and the rear end.

22. The system of claim 18, wherein the lower propulsion unit includes a front end and a rear end, wherein the lower propulsion unit includes a propeller proximate the rear end and wherein the cavity is adjacent the rear end.

23. The system of claim 18, wherein the lower propulsion unit includes a front end and a rear end, wherein the lower propulsion unit includes a propeller proximate the rear end and wherein the cavity is adjacent the front end.

24. The system of claim 18, wherein the mount partially receives the transducer.

* * * * *